(12) United States Patent
Stefani

(10) Patent No.: US 6,923,375 B2
(45) Date of Patent: Aug. 2, 2005

(54) AIRCRAFT WEIGHT AND BALANCE SYSTEM

(75) Inventor: Rolf Stefani, West River, MD (US)

(73) Assignee: Arinc, Inc., Annapolis, MD (US)

( * ) Notice: Subject to any disclaimer, the term of this patent is extended or adjusted under 35 U.S.C. 154(b) by 0 days.

(21) Appl. No.: 10/438,100

(22) Filed: May 15, 2003

(65) Prior Publication Data

US 2004/0226996 A1 Nov. 18, 2004

(51) Int. Cl.$^7$ .............................................. G06K 7/10
(52) U.S. Cl. ........................... 235/462.01; 235/462.45; 235/472.01; 235/487; 235/492; 702/175
(58) Field of Search ...................... 235/462.01, 462.45, 235/472.01, 487, 492; 702/175; 177/198, 199, 200

(56) References Cited

U.S. PATENT DOCUMENTS

| | | | |
|---|---|---|---|
| 3,584,503 A | 6/1971 | Senour | |
| 4,225,926 A | 9/1980 | Wendt | |
| 4,446,524 A | 5/1984 | Wendt | |
| 4,711,994 A * | 12/1987 | Greenberg | .................. 235/384 |
| 4,935,885 A * | 6/1990 | McHale et al. | ............. 702/175 |
| 5,051,565 A * | 9/1991 | Wolfram | ..................... 235/384 |
| 6,594,547 B2 * | 7/2003 | Manabe et al. | ............. 700/227 |

* cited by examiner

*Primary Examiner*—Steven S. Paik
(74) *Attorney, Agent, or Firm*—Oliff & Berridge, PLC

(57) ABSTRACT

Dynamic aircraft/vehicle specific load planning and weight balancing systems and methods are used to automate the process of weighing passengers and their baggage, including carry-on baggage, to accurately and quickly determine the passenger and passenger baggage location on a specific aircraft/vehicle to generate an efficient and precise aircraft load plan and provide data to determine loaded aircraft weight and balance. Digital scale(s) and passenger ticket/boarding pass scanner(s) are used to acquire the weight and location data, which can be fed to a processor to process the data to determine appropriate weight and balance for each flight and/or transmit data to other systems to be included in their determination of vehicle weight and weight distribution/balance.

20 Claims, 4 Drawing Sheets

AIRCRAFT WEIGHT AND BALANCE SYSTEM

BACKGROUND OF THE INVENTION

1. Field of Invention

This invention relates generally to a high-accuracy system and method to be used in the computation of a vehicle's weight and balance. More specifically, this invention relates to real-time, automatic and high-accurate systems and methods for measuring individual passengers and luggage weight to be used for calculating an aircraft's exact weight and balance and load plan.

2. Description of Related Art

It is well known that inaccurate aircraft weight and balance estimates may contribute to airplane crashes, especially crashes of smaller planes that carry, for example, from 10–19 passengers. Currently, weight and balance estimates are used to avoid overloading an airplane, i.e., making it too heavy to safely fly, and avoiding weight imbalances, which also make airplanes difficult or impossible to fly safely. The current Federal Aviation Administration (FAA) advisory, e.g., AC 120-27C, which is used by most airlines require the airlines to use estimated passenger and/or passenger baggage weights. The average passenger and/or passenger baggage weight estimates provide generally, that the average passenger weight, including carry-on luggage, is 180 lbs. in the summer and 185 lbs. in the winter. Check-in bags are presumed to weigh 25 lbs. for domestic flights and 30 lbs. for international flights. However, the estimates obviously do not provide an accurate means to calculate a passenger airplane's total passenger weight. The airlines may ask passengers to divulge their weight. However, because most people might be expected to underestimate their weight, this method is also considered to provide an inaccurate means to determine the total passenger/passenger baggage weight of the aircraft. Equally as important as total passenger/baggage weight is passenger and carry-on baggage weight distribution because it affects an aircraft's center of gravity. For example, placing too many bags in the rear compartments of a vehicle such as, for example, an aircraft, or seating heavy people at the rear of the aircraft may significantly change a small plane's center of gravity and thereby make it relatively difficult to fly safely. Additionally, it is important to know the fuel weight and actual location so as to accommodate the precise information when calculating the required weight and balance.

U.S. Pat. Nos. 4,225,926 and 4,446,524 disclose ascertaining the individual weight of total load including that of passengers and hand baggage. The load is weighed using a sensing device such as a group of load cells or a platform that is arranged at the entrance door inside of the aircraft for passengers and the entrance to the freight compartment for baggage. Although the device disclosed in U.S. Pat. Nos. 4,225,926 and 4,446,524 allow for weighing passenger and baggage weight, it does not allow for any additional flexibility, such as arranging the platform at or near the gate terminal and/or check-in counter.

U.S. Pat. No. 3,584,503 discloses determining an aircraft's gross weight and center of gravity by incorporating strain gage transducers mounted in the landing gear axles and in the nose restraint, an attitude sensor, a processor and an indicator-control unit. The transducer provide electrical signals which are proportional to the landing gear loads. The processor receives and sums these signals to provide appropriate outputs to the gross weight and center of gravity indicators. However, the device disclosed in U.S. Pat. No. 3,584,503 cannot individually calculate and locate the weight of each passengers and baggage on an airplane.

Other known weight and balance systems determine overall weight and position of center of gravity of an aircraft through potentiometric level gauges or by measuring the trim correction drag. These systems do not allow a real-time measurement of the total weight and balance. Furthermore, such systems do not allow an accurate measurement of the total weight and balance.

None of these systems provide for measuring the precise weight and balance of an aircraft in real-time for each passenger and their baggage.

SUMMARY OF THE INVENTION

Accordingly, one object of this invention is to provide systems and methods for real-time, automatic and highly-accurate systems and methods that measure individual passengers and luggage weight to be used for calculating an aircraft's weight and balance.

This invention separately provides a system and method that can be used to automate the process of weighing passengers and their carry-on baggage in order to accurately and quickly determine their weight and the actual physical location of the weight on the aircraft.

This invention separately provides a system and method that can compute a precise and accurate weight and balance profile of an aircraft.

This invention separately provides a system and method that can aquire data in real-time to dynamically compute the weight and balance of an aircraft.

This invention separately provides systems and methods to generate an efficient vehicle/aircraft load plan.

This invention separately provides systems and methods to determine the appropriate weight and balance for each aircraft flight.

This invention separately provides systems and methods to validate the weights of passengers and the baggage that they are carrying on board a vehicle/aircraft.

This invention separately provides systems and methods to assemble a vehicle weight and balance system with relatively low cost.

In various exemplary embodiments of the systems and methods according to this invention, the weight and balance system provides a weight determiner, such as, for example, a weighing scale to weigh each passenger and the passenger's carry-on baggage, a detection device, e.g., scanning device to determine the seat number (linked to actual physical location) in which the passenger sits, such as, for example, by scanning a passenger boarding pass and/or ticket, and a processor, such as, for example, a personal computer (PC) to process the information obtained by the weight determiner and passenger seat location.

In a further exemplary embodiments of the systems and methods according to this invention, the weighing scale may be a digital platform scale to weigh accurately each passenger and the passenger's carry-on baggage. The platform scale may be placed in any suitable location, including, for example, at or near the terminal gate and/or check-in counter.

In a further exemplary embodiments of the systems and methods according to this invention, the scanning device scans the flight number on the ticket. The same scanning system used to weigh passengers and their carry-on baggage, may be used by an aircraft load crew personnel to scan baggage tags through barcodes, and an airline may use the same hardware and software to weigh and account for baggage and cargo as it is loaded into the aircraft baggage and/or cargo area. With knowledge of each passenger boarded and all luggage loaded, a clear accounting of all baggage and passenger weight and distribution can be easily accomplished.

In various exemplary embodiments of the systems and methods according to this invention, the weight and balance system can be configured as a stand-alone system.

In further exemplary embodiments of the systems and methods according to this invention, the weight and balance system can be integrated into existing avionic systems.

In yet further exemplary embodiments of the systems and methods according to this invention, the weight and balance system is independent of the aircraft type in the sense that it can be used for a wide variety of aircraft because the calculation of the weight and balance for a specific airplane takes into account such figures as the Centroid, Mean Aerodynamic Chord (MAC) and Leading Edge MAC (LEMAC), all of which are established by the airplane manufacturer for each individual aircraft.

In various exemplary embodiments of the systems and methods according to this invention, the weight and balance system enters all of the weight that is distributed throughout the aircraft automatically.

In a further various exemplary embodiments of the systems and methods according to this invention, the weight and balance system provides for entry of all of the weight that is distributed on the aircraft manually, i.e., one or more users input data into the processor, such as, for example, a personal computer. The manual data can also include fuel weight associated to specific tanks in order to include fuel weight in the necessary load planning and weight and balance determinations.

In various exemplary embodiments of the systems and methods according to this invention, the weight and balance system transmits weight data to other avionic systems which are used to determine unloaded (with passengers and/or passenger luggage) aircraft weight and weight distribution/balance.

In various exemplary embodiments of the systems and methods according to this invention, the load plan or weight and balance data can be sent to an user dispatch center for review and use.

In various exemplary embodiments of the systems and methods according to this invention, the load plan or weight and balance data can be dynamically adjusted to assist in redistribution of weight (passenger, baggage and/or cargo) as required in order to achieve a weight and balance calculation that is within the aircraft performance envelope.

In a various exemplary embodiments of the systems and methods according to this invention, the load plan or weight and balance data can be dynamically manipulated in order to allow passengers to change seat locations onboard an aircraft in real-time while re-computing the weight and balance to ensure that the new weight and balance is within the aircraft performance envelope.

In a further various exemplary embodiments of the systems and methods according to this invention, the load plan or weight and balance data can be sent to the pilot for review.

These and other features and advantages of this invention are described in, or are apparent from, the following detailed description of various exemplary embodiments of the systems and methods according to this invention.

BRIEF DESCRIPTION OF THE DRAWINGS

The accompanying drawings are incorporated into and form a part of the specification to illustrate various exemplary embodiments of the present invention. These drawings, together with the description, serve to explain the principles of the various exemplary embodiments of the invention. The drawings are only for the purpose of illustrating alternative exemplary embodiments of how the invention can be made and used and are not to be construed as limiting the invention to only the illustrated and described exemplary embodiments. Further features and advantages will become apparent from the following description of the various exemplary embodiments of the invention as illustrated in the accompanying drawings, wherein.

DETAILED DESCRIPTION OF EXEMPLARY EMBODIMENTS

Figure 1:
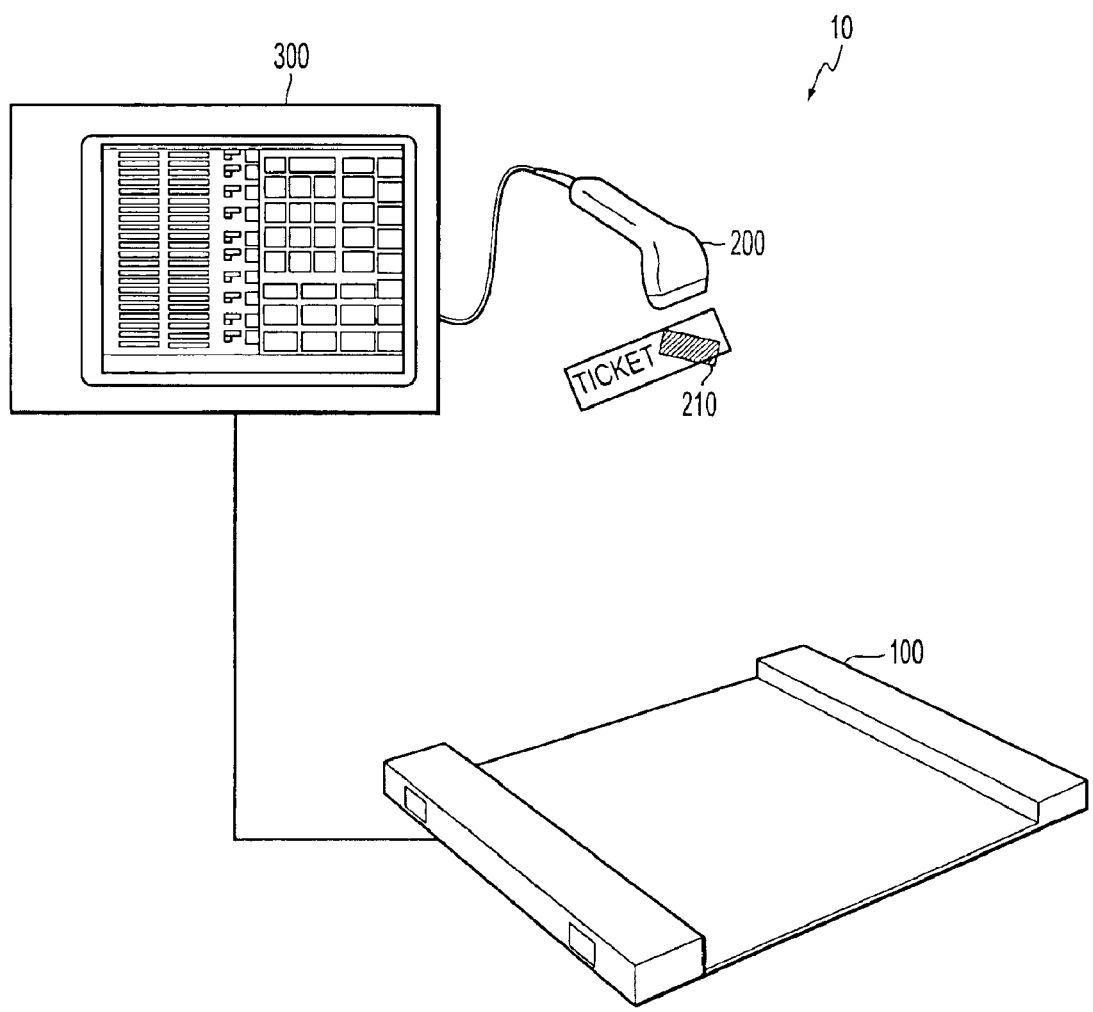
FIG. 1 is a schematic representation of a system of one exemplary embodiment of a weight and balance system according to this invention.

FIG. 1 illustrates one exemplary embodiment of a weight and balance system according to this invention. The weight and balance system 10 includes a weighing scale 100 to weigh each passenger and the passenger's carry-on baggage or checked baggage and/or cargo, a scanning device 200 to scan each passenger's ticket for the passenger's assigned seat number and a processor/personal computer (PC) 300 to calculate the weight and balance of passengers and/or passenger baggage or checked baggage and/or cargo for each aircraft flight.

The weighing scale 100 is preferably, but not limited to, providing a digital output. As an exemplary embodiment, the digital weighing scale 100 is a platform with a size of 30"×30" and a capacity range up to 1,000 lbs., with a digital output. The weighting scale 100 can be an analog weigh scale, for example, with its analog output converted to a digital output.

The weighing scale 100 may be provided with an interface, such as, but not limited to, a RS232 serial port, 802.11 a, b or g wireless LAN, or Bluetooth wireless communications technology for computers and printers. The processor 300 receives the data from the weighing scale 100 via the interface and calculates the appropriate weight and balance of the aircraft and/or other vehicle using the aircraft specific variables stored on the processor.

It should be appreciated that in various exemplary embodiments that the weighing scale can be lightweight so that the appropriate personnel may transport the scale to different locations, such as, but not limited to, check-in counter, terminal gate, concourse of the regional airlines aircraft, and/or security check-point gate.

It should also be appreciated that in various exemplary embodiments, the system allows authorized personnel to enter the passenger and/or baggage and/or cargo weights and actual locations into the vehicle weight and balance system manually.

The scanning device 200 scans a bar code 210 printed on each passenger's ticket. The scanning device 200 uses the bar code 210 to obtain data about the passenger. Because bar codes 210 have become part of everyday commercial transaction, it is probably the quickest and most accurate means for encoding, reading, extracting and/or decoding of data. Barcodes are also a standard component and capability of most airline ticket printers. However, other scanned data detection system may be provided to accomplish the encoding, reading, extracting and/or decoding of data. Bar codes 210 traditionally involves sequence of two elements types: bars and spaces. The bars and spaces are arranged such that the bars are parallel and the spaces separate the bars. One encoding methodology varies the width and the sequence of the elements to encode data. For example, the scanning device 200 may use the bar code information to identify the passengers and enter their exact weight into the weight and balance system. The data is then transmitted to the processor 300 to calculate the weight and balance of the aircraft.

It should be appreciated that in various exemplary embodiments that the bar code scanner includes, but not limited to, laser and/or charge coupled device (CCD).

It should be appreciated that in various exemplary embodiments that bar code tags may be attached to the carry-on baggage and/or checked baggage and/or cargo to obtain the exact weight of the unit. The data is then transmitted to the processor 300 to calculate and/or update the weight and balance of the aircraft.

Provision may also be made to update actual passenger location(s) and passenger baggage location(s) prior to aircraft take-off and/or in-flight to determine if any passengers have moved from their assigned seats and/or passenger baggage has been relocated. In various exemplary embodiments of the systems and methods of the invention, this may include the use of additional scanners, sensors, crew checks, etc.

It should also be appreciated that in various exemplary embodiments that the bar code 210 may include data about the exact seat location for an individual passenger. With knowledge of each passenger's weight and their seat location, the processor 300 may calculate the weight and balance of the aircraft automatically and accurately.

It should also be appreciated that in various exemplary embodiments that the bar code 210 may obtain other data, for example, but not limited to, relevant flight information, age of the passenger and address of the passenger.

The processor 300 interfaces with the digital scale 100 and scanner 200 and computes the weight and balance of the aircraft. The digital scale 100 transmits the weight of the individual passengers and baggage data to the processor 300. The scanner 20 transmits the exact seat location of each passengers and baggage data to the processor 300. The digital scale 100 and the scanner 200 can interface simultaneously at the same time to provide weight and balance for all aspects of aircraft load plan. In other words, the processor 300 automatically processes the weighed data from the digital scale 100 while at the same time, the processor 300 automatically identifies the passenger through the scanning device 200 to obtain the actual target location on the aircraft. The digital scale 100 and the scanner 200 communicate load data with the processor 300 via available communications capabilities, for instance, but not limited to, direct Ethernet connection or wireless connection using commercial wireless local area network (LAN) technologies.

Further, the processor 300 may transfer the data to other avionic systems, such as an Electronic Flight Bag (EFB) which is typically a tablet PC device used in the cockpit for various operational capabilities take-off performance calculations based on accurate weight and balance and load plan data. The EFB requires weight and balance data to develop the accurate and safe performance envelope calculations needed. The data required includes aircraft weight and weight distribution, including center of gravity, of an aircraft with and/or without passengers and/or passenger baggage.

In one exemplary embodiment, the processor 300 is a touch-pad screen, as shown in FIG. 1. The touch screen PC technology provides a convenient and simple human machine interface in order to facilitate manual data entry. The aircraft locations (including seats, baggage, cargo and fuel locations) are graphically depicted and allow the user to manually select a specific location where weight will be attributed to, if required.

A core component of the weight and balance computation relies on the aircraft specific variables for each location of concern. Each seat, cargo area and fuel tank area are attributed specific centroid values in an aircraft specific data base and are accessed and used dynamically in each aircraft specific weight and balance computation interaction.

It should be appreciated that in various exemplary embodiments that a personal digital assistant (PDA) may be used as a processor/computer to determine the weight and balance of the aircraft.

Figure 2:
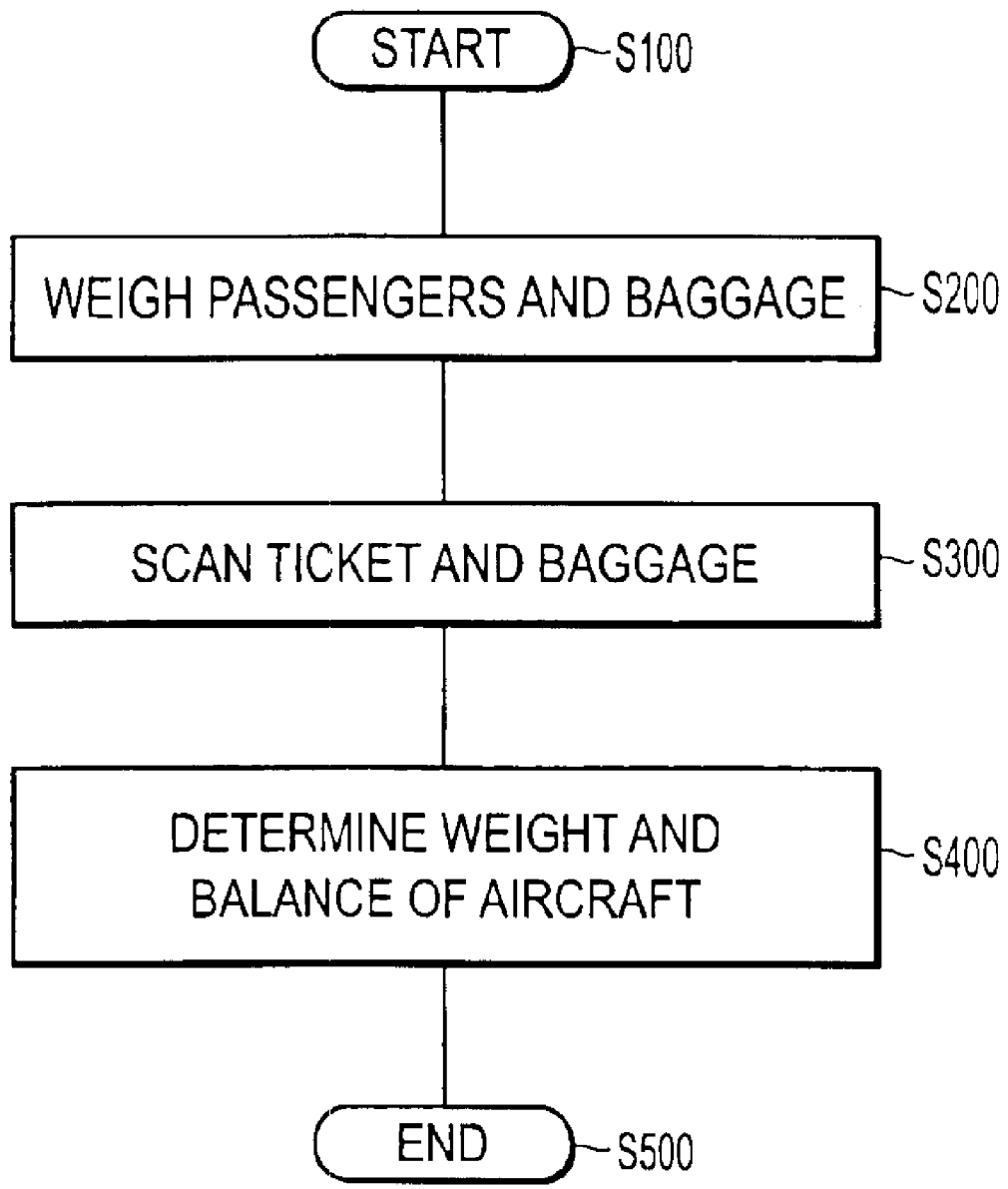
FIG. 2 is a flowchart illustrating an exemplary method of determining vehicle, e.g., aircraft, weight and balance according to this invention.

FIG. 2 is a flowchart illustrating an exemplary method of determining the weight and balance of a vehicle, e.g., aircraft, according to this invention. In one exemplary embodiment, the method begins at step S100 and proceeds to step S200 where the passengers and baggage are weighed. It should also be appreciated that in various exemplary embodiments of the methods of the invention, authorized personnel may determine the passengers weight manually and/or manually provide the weight and distribution data manually.

The weighing step S200 is followed by a scanning step S300, during which the ticket of the passenger is scanned for seat location. The scanning step S300 may also include scanning bar code tags for each freight baggage and carry-on baggage to determine the weight and balance of the aircraft. The data scanned from the scanning step includes, but not limited to, seat location, flight information and passenger information. Following step S300, the system proceeds to the computing step S400.

In step S400, the weight and balance of the aircraft is determined by receiving data from the weighing step S100 and the scanning step S200.

Figure 3:
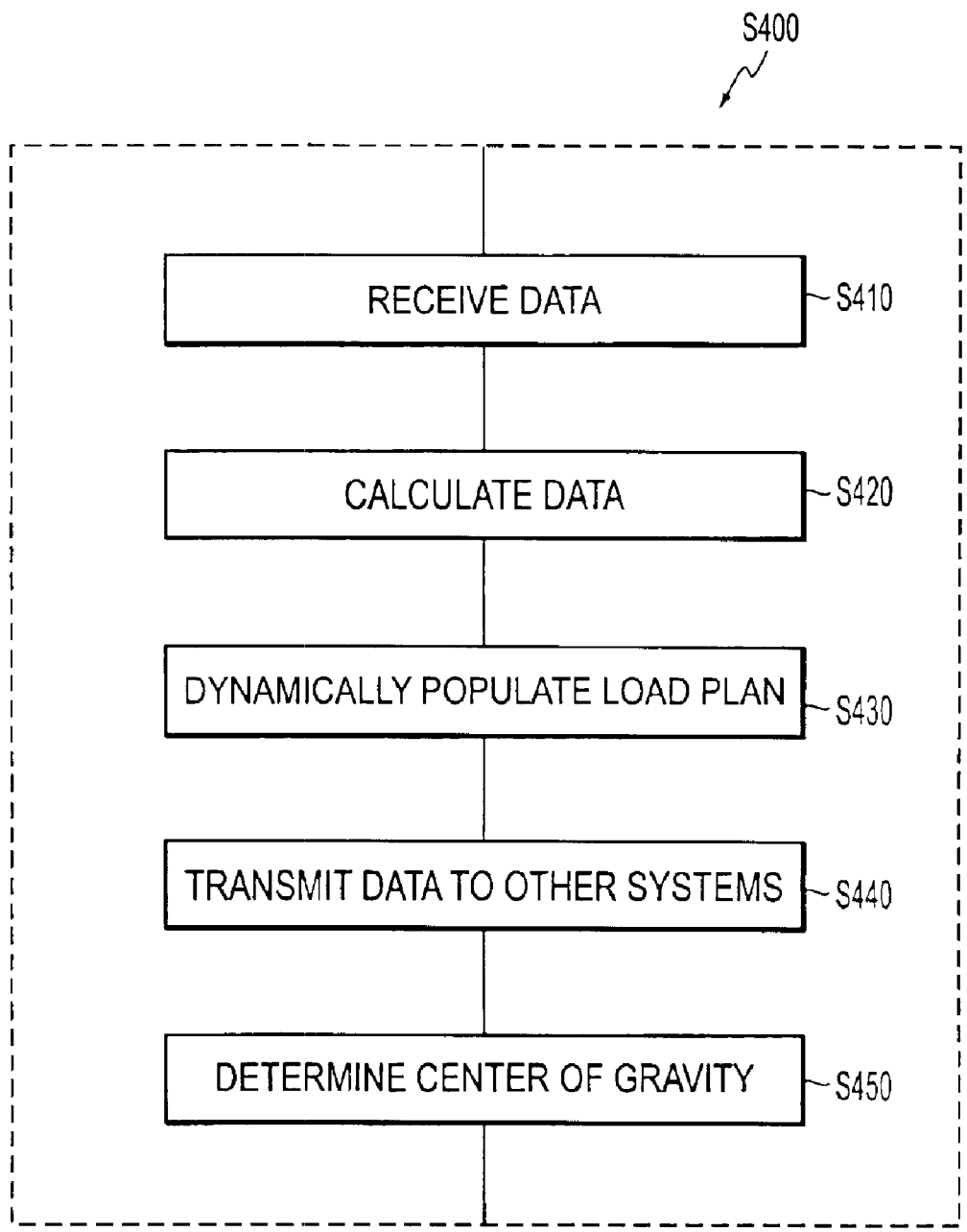
FIG. 3 is a flowchart illustrating an exemplary method of computing vehicle, e.g., aircraft, weight and balance according to this invention.

FIG. 3 is a flowchart illustrating an exemplary method of computing the weight and balance according to this invention. FIG. 3 describes in greater detail the computing step S400. The process begins as the processor 300 receives the data step S410. The data received is from the weighing step S100 and the scanning step S200. Following the receiving step S410, the system proceeds to step S420.

Step S420 determines the data received from previous steps. In step S420, the data received from step S410 is used to determine the weight and balance of the aircraft. The method of step S420 may include data concerning the vehicle, e.g., an aircraft with respect to the vehicle type, for example, but not limited to centroid, mean aerodynamic chord (MAC) and leading edge MAC (LEMAC), all of which are established by the manufacturer.

The data used in step S420 reflects the fact that every specific aircraft has a unique and custom weight and balance set of algorithms specific to that individual aircraft and that by using data specific to all aircraft available, a custom and exact weight and balance determination can be accurately generated in real time for all aircraft using the method.

It should be appreciated that in various exemplary embodiments that the method also provides the user to manually input the data. In other words, the user manually inputs the data of each passengers and baggage to-be used by the methods according to this invention.

It should further be appreciated that in various exemplary embodiments that the software has the capability for the user to input the data by touch-screen display, conventional PC keyboard and mouse input or with stylus technology.

Control then proceeds to step S430, where a load plan fields are dynamically populated so that all required inputs are accounted for. Each seat location, baggage storage area, cargo area and fuel compartment have either been assigned appropriate weight or have been designated as empty. Dynamic population of the load plan is accomplished by interpretation/decoding the passenger ticket barcode while simultaneously gathering weight data from the scale and assigning the acquired weight to the appropriate passenger field in the computation field. Step S430 highly automates the process of weighing each passenger and piece of passenger baggage, and at the same time, automatically identifies the passenger to determine the passenger's assigned seat location.

Thus, the actual target location on the aircraft is determined and the weight and balance is determined using substantially accurate data. Following step S430, data which is used in step S430 is transmitted to systems other than the processor 300 in step S440.

Step S440 transfers the received passenger and/or passenger baggage data to a system other than processor 300 to determine passenger and/or passenger baggage weight and balance to other airborne systems, such as, but not limited to, a cockpit EFB or to a dispatcher computer system for additional archiving and processing in other applications, such as performance envelope calculations.

Control then proceeds to step S400 which determines the center of gravity of the aircraft in step S450. Knowing the position of the center of gravity and the total weight of the load of an aircraft is very useful and even essential in terms of operating a vehicle, e.g., aircraft safely. The location of the center of gravity of the total load affects safety, stability, speed and performance of the aircraft. Further, knowing these parameters provides the optimum position of the center of gravity of the vehicle, e.g., aircraft, in relation to the application of lift of an aircraft.

It should also be appreciated that readily movable loads, such as fuel can be detected and altered so that the general center of gravity can be obtained under a variety of movable load conditions.

Figure 4:
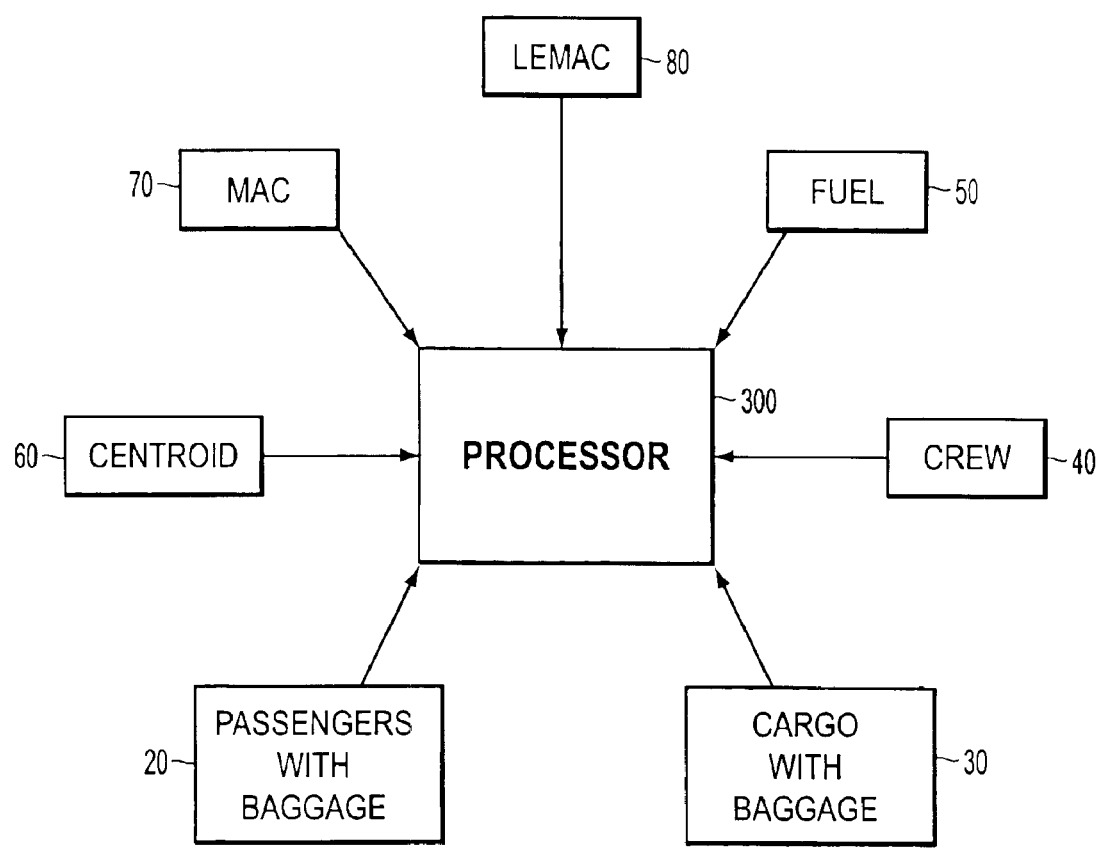
FIG. 4 is a schematic view of an exemplary embodiment of a processor used to help implement the systems and methods according to this invention.

FIG. 4 is a schematic view of an exemplary embodiment of a processor 300 according to this invention. FIG. 4 describes in greater detail the data received by the processor 300. The processor 300 receives data of, but not limited to, weight of passengers including baggage 20, cargo including baggage 30, crew 40, fuel 50, centroid 60, mean aerodynamic chord (MAC) 70 and leading edge MAC (LEMAC) 80, and performs necessary calculations utilizing aircraft specific variables available in an aircraft specific database to formulate the weight and balance parameters.

The data can include fuel weight associated to specific tanks in order to include fuel weight and distribution in the load planning and weight balancing methods according to this invention.

It should be appreciated that system 10 is capable of sending a load plan or weight and balance determination data to a users dispatch center or to a pilot (if the vehicle, e.g., aircraft is so equipped) using various data link communications capabilities, including but not limited to, commercial internet, cellular data messaging and ACARS VHF, HF and SatCom radio communications.

While this invention has been described in conjunction with the exemplary embodiments outlined above, it is evident that many alternatives, modifications and variations will be apparent to those skilled in the art. Furthermore, although the exemplary embodiments are described for use in a variety of aircraft, it is contemplated that this invention may be used with other methods of transportations through the land and the sea. Accordingly, the exemplary embodiments of the invention, as set forth above, are intended to be illustrative, not limiting. Various changes may be made to the invention without departing from the spirit and scope thereof.

What is claimed is:

1. A weight and balance system for determining passenger and baggage weight and distribution in a vehicle in real-time, comprising:
    a weighing scale for determining weight of the passengers and baggage;
    a scanning device for obtaining data concerning each passenger's location in the vehicle;
    an input device for entering data into appropriate calculation fields; and
    a processor for calculating the weight and weight distribution of the passengers and baggage in the vehicle on a real time basis based on the passenger weight and baggage weight and location of the passengers and baggage in the vehicle.

2. The system according to claim 1, wherein the scanning device scans a passenger ticket to determine an assigned seat for the passenger.

3. The system according to claim 2, wherein the scanning device scans a passenger ticket for flight information.

4. The system according to claim 1, wherein the scanning device is a bar code scanner.

5. The system according to claim 4, wherein the scanning device scans baggage bar code tags.

6. The system according to claim 5, wherein the scanning device scans cargo container identification bar code tags.

7. The system according to claim 1, wherein the processor is a PDA or tablet PC device.

8. The system according to claim 1, wherein the processor transmits passenger weight and location data to avionic systems.

9. The system according to claim 1, wherein the input device is a touch-screen.

10. The system according to claim 1, wherein the weighing scale has a digital output capability.

11. The system according to claim 1, wherein the vehicle is an aircraft.

12. A method for measuring individual passengers and baggage weight in real-time to be used in the determination of vehicle load weight and balance, comprising:
    determining the weight of the passengers and baggage;
    scanning passenger tickets to determine assigned seat locations for the passengers;
    inputting data to determine appropriate calculation fields; and
    determining the passenger and baggage load weight and distribution of the vehicle by processing the determined weight and weight distribution.

13. The method according to claim 12, wherein the determining the passenger and baggage load weight and distribution automatically identifies the passenger to determine the passenger's assigned seat location.

14. The method according to claim 12, wherein the scanning comprises a bar code scanner.

15. The method according to claim 14, wherein the bar code scanner scans baggage bar codes tags.

16. The method according to claim 14, wherein the bar code scanner scans cargo container identification bar codes tags.

17. The method according to claim 12, wherein the inputting the data is manually inputted.

18. The method according to claim 12, further comprising sending the weight and balance distribution information to a user dispatch center.

19. The method according to claim 18, further comprising sending the weight and weight distribution information to a pilot.

20. The method according to claim 12, wherein the vehicle is an aircraft.

* * * * *